(12) United States Patent
Clarke

(10) Patent No.: US 9,618,773 B2
(45) Date of Patent: Apr. 11, 2017

(54) OPHTHALMIC LENSES WITH OXYGEN-GENERATING ELEMENTS THEREIN

(71) Applicant: Novartis AG, Basel (CH)

(72) Inventor: Roger Brian Minchin Clarke, Cambridge (GB)

(73) Assignee: Novartis AG, Basel (CH)

( * ) Notice: Subject to any disclaimer, the term of this patent is extended or adjusted under 35 U.S.C. 154(b) by 28 days.

(21) Appl. No.: 14/680,218

(22) Filed: Apr. 7, 2015

(65) Prior Publication Data

US 2015/0286072 A1 Oct. 8, 2015

Related U.S. Application Data

(60) Provisional application No. 61/976,851, filed on Apr. 8, 2014.

(51) Int. Cl.
*G02C 7/00* (2006.01)
*G02C 7/02* (2006.01)
(Continued)

(52) U.S. Cl.
CPC ............ *G02C 7/049* (2013.01); *B29C 39/026* (2013.01); *B29D 11/00076* (2013.01); *B29D 11/00807* (2013.01); *G02C 7/04* (2013.01); *G02C 7/046* (2013.01); *G02C 7/083* (2013.01); *B29L 2011/0016* (2013.01); *G02C 2202/16* (2013.01)

(58) Field of Classification Search
CPC ........ A61F 2/16; A61F 2/1613; A61F 2/1635; G02C 7/04; G02C 7/08; G02B 3/14
USPC ......... 351/159.02, 159.03, 159.04; 623/6.11, 623/6.13
See application file for complete search history.

(56) References Cited

U.S. PATENT DOCUMENTS 4,268,132 A * 5/1981 Neefe ...................... 351/159.33
4,401,371 A * 8/1983 Neefe ...................... 351/159.33
(Continued)

FOREIGN PATENT DOCUMENTS

EP 0367513 A2 5/1990
WO 87/04390 A1 7/1987

OTHER PUBLICATIONS

PCT International Search Report dated Sep. 10, 2015, International Application No. PCT/EP2015/057486, International Filing Date Apr. 7, 2015.
(Continued)

*Primary Examiner* — James Greece
(74) *Attorney, Agent, or Firm* — Jian Zhou

(57) ABSTRACT

Described herein is a contact lens which can actively generate oxygen that is directly supplied to the cornea when it is worn by a patient. The contact lens comprises: a lens body composed of a hydrogel material or preferably a silicone hydrogel material; at least one anode for electrolytically generating oxygen from water in contact with the anode; and at least one cathode operatively coupled with the anode to form an electrolytic cell. The anode and the cathode are embedded within the lens body and operatively connected to a power source and to a control element which automatically applies a potential voltage between the anode and the cathode, drives an electrical current through the anode and the cathode to generate oxygen from electrolysis of water, and controls the timing and duration of electrolysis of water in the eye.

20 Claims, 2 Drawing Sheets

(51) Int. Cl.
*G02C 7/04* (2006.01)
*G02C 7/08* (2006.01)
*B29C 39/02* (2006.01)
*B29D 11/00* (2006.01)
*B29L 11/00* (2006.01)

(56) References Cited

U.S. PATENT DOCUMENTS

| | | |
|---|---|---|
| 4,444,711 A | 4/1984 | Schad |
| 4,460,534 A | 7/1984 | Boehm |
| 5,098,546 A | 3/1992 | Kawashima |
| 5,156,726 A | 10/1992 | Nakada |
| 5,508,317 A | 4/1996 | Müller |
| 5,583,163 A | 12/1996 | Müller |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger |
| 5,900,127 A | 5/1999 | Iida |
| 6,264,807 B1 | 7/2001 | Fenner |
| 6,627,124 B1 | 9/2003 | Herbrechtsmeier |
| 6,800,225 B1 | 10/2004 | Hagmann |
| 6,851,805 B2 | 2/2005 | Blum |
| 6,857,741 B2 * | 2/2005 | Blum et al. ............... 351/159.39 |
| 7,074,307 B2 | 7/2006 | Simpson |
| 7,384,590 B2 | 6/2008 | Kelly |
| 7,387,759 B2 | 6/2008 | Kelly |
| 7,468,121 B2 | 12/2008 | Hosonuma |
| 7,490,936 B2 | 2/2009 | Blum |
| 7,813,807 B2 | 10/2010 | Franklin |
| 8,154,804 B2 | 4/2012 | McGinn |
| 8,163,206 B2 | 4/2012 | Chang |
| 8,529,057 B2 | 9/2013 | Qiu |
| 2004/0027536 A1 * | 2/2004 | Blum et al. .................. 351/168 |
| 2010/0072643 A1 | 3/2010 | Pugh |
| 2010/0076553 A1 | 3/2010 | Pugh |
| 2014/0000101 A1 | 1/2014 | Pugh |

OTHER PUBLICATIONS

PCT Written Opinion of the International Searching Authority dated Sep. 10, 2015, International Application No. PCT/EP2015/057486, International Filing Date Apr. 7, 2015.

* cited by examiner

OPHTHALMIC LENSES WITH OXYGEN-GENERATING ELEMENTS THEREIN

This application claims the benefit under 35 USC §119 (e) of U.S. provisional application No. 61/976,851 filed Apr. 8, 2014, herein incorporated by reference in its entirety.

This invention is related to an ophthalmic lens, in particular, a contact lens, which comprises oxygen-generating elements therein.

BACKGROUND

Cornea cannot receive oxygen from the blood supply like other tissue. When the eye is open, the cornea primarily receives oxygen from the atmosphere, via the tears. When the eye is closed (e.g., during sleep), the cornea receives oxygen mainly from oxygen diffusion from the capillary plexus of the upper palpebral aperture vasculature. If sufficient oxygen does not reach the cornea, corneal swelling occurs. Extended periods of oxygen deprivation cause the undesirable growth of blood vessels in the cornea.

Wearing of a soft contact lens inevitably reduces the oxygen supply to the cornea, because it can form an oxygen barrier that prevents oxygen from reaching the cornea. The oxygen transmissibility of the contact lens worn by a patient is of vital importance for the oxygen supply to the cornea either from the atmosphere in the open eye state or from the capillary plexus of the upper palpebral aperture vasculature. In recent years, soft silicone hydrogel contact lenses become more and more popular because of their high oxygen transmissibility and comfort. By having high oxygen transmissibility, a silicone hydrogel contact lens allows sufficient oxygen to permeate through the lens to the cornea and to have minimal adverse effects on corneal health.

Recently, it has been proposed that liquid crystal electro-optic elements can be incorporated in contact lenses to provide electro-active, dynamic optics for vision correction of one or more focal lengths. See, U.S. Pat. Nos. 6,851,805, 7,490,936 and 8,154,804. However, the presence of those electro-optic elements inevitably substantially or totally prevent oxygen from permeating through the contact lens with the electro-optic elements therein to the cornea and can have detrimental effects on corneal health.

Therefore, there is still a need for a contact lens which would not rely on passive oxygen diffusion/transmission. A proposed solution to this problem described in this patent is to enable the contact lens to actively generate an in vivo oxygen supply directly to the cornea.

SUMMARY

The invention present invention is related to a contact lens, which comprises a lens body composed of a hydrogel material or a silicone hydrogel material, at least one anode for electrolytically generating oxygen from water in contact with the anode, and at least one cathode operatively coupled with said at least one anode to form an electrolytic cell, wherein the anode and the cathode are embedded within the lens body and operatively connected to a power source and to a control element, wherein the control element is capable of automatically applying a potential voltage between the anode and the cathode and driving an electrical current through the anode and the cathode to generate oxygen from electrolysis of water, and controlling the timing and duration of electrolysis of water when the contact lens is worn by a patient.

These and other aspects, features and advantages of the invention will be understood with reference to the figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION

Figure 1:
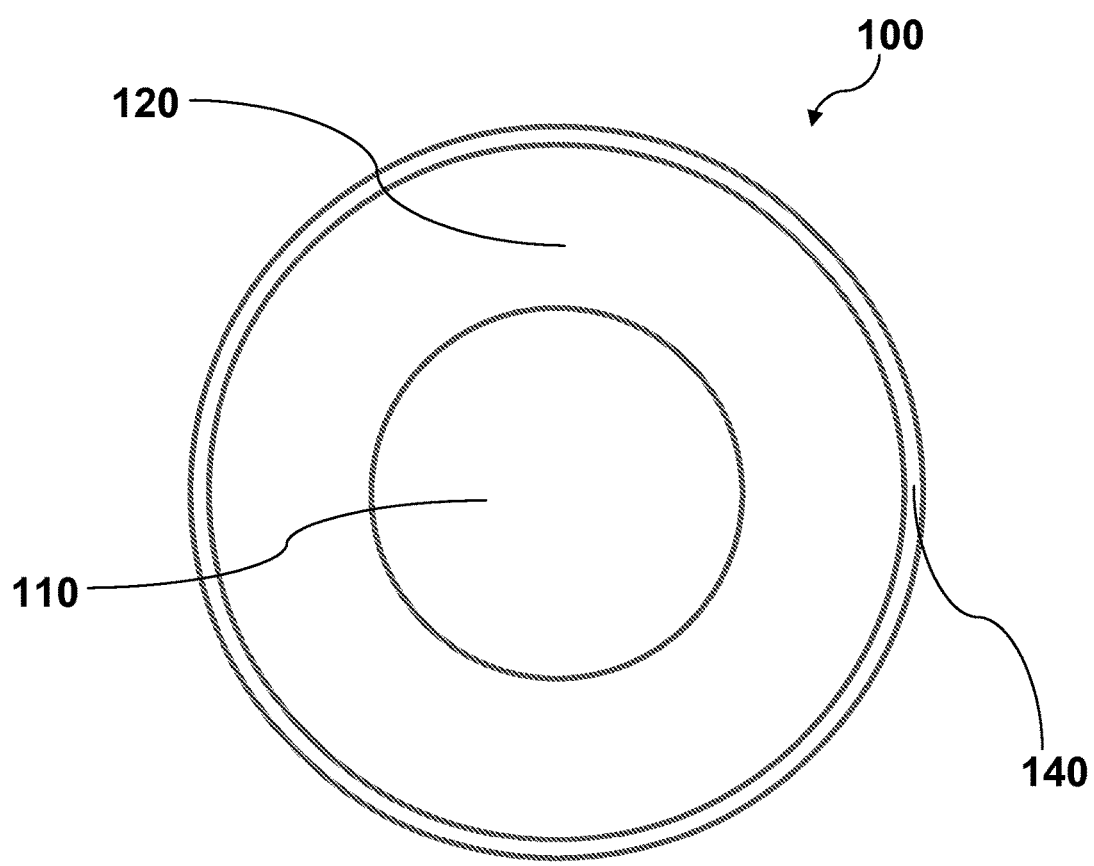
FIG. 1 illustrates schematically a contact lens.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

As used in this application, the term "optional" or "optionally" means that the subsequently described event or circumstance can or cannot occur, and that the description includes instances where the event or circumstance occurs and instances where it does not.

The present invention is generally directed to a contact lens which can actively generate in vivo oxygen to be supply directly to the cornea behind the contact lens when it is worn by a patient. It is discovered that in vivo electrolysis of water can be used in actively generating sufficient oxygen just by using at least one anode, at least one cathode, and a power source (e.g., a battery) for supply to the cornea behind the contact lens worn by a patient. The electrolysis half-reactions of water can occur in a contact lens of the invention as following: at anode $2H_2O \rightarrow O_2 + 4H^+ + 4e^-$; and at cathode $2H_2O + 2e^- \rightarrow 2H_2 + 2OH^-$. It is estimated that electrolysis of water with the use of one battery with a 100 µWhr capacity for one day's full use based on the assumption of 100% efficiency could generate about $2.6 \times 10^{-7}$ moles of oxygen, similar to the amount of oxygen provided to the eye by a contact lens having a thickness of 80 microns and an oxygen permeability (Dk) of 28 barriers via passive diffusion mechanism.

A contact lens of the invention comprises a lens body composed of a hydrogel material or a silicone hydrogel material, at least one anode for electrolytically generating oxygen from water in contact with the anode, and at least one cathode operatively coupled with said at least one anode to form an electrolytic cell, wherein the anode and the cathode are embedded within the lens body and operatively connected to a power source and to a control element, wherein the control element is capable of automatically applying a potential voltage between the anode and the cathode and driving an electrical current through the anode and the cathode to generate oxygen from electrolysis of water, and controlling the timing and duration of electrolysis of water when the contact lens is worn by a patient.

As used in this application, the term "contact Lens" refers to a structure that can be placed on or within a wearer's eye, as known to a person skilled in the art. A contact lens can correct, improve, or alter a user's eyesight, but that need not be the case. A contact lens can be of any appropriate material known in the art or later developed, and can be a soft lens, a hard lens, or a hybrid lens. Soft contact lenses are hydrogel contact lens or silicone hydrogel contact lenses.

A "hydrogel contact lens" refers to a contact lens having a lens body made of a hydrogel material. A "silicone hydrogel contact lens" refers to a contact lens having a lens body made of a silicone hydrogel material.

As used in this application, the term "hydrogel" or "hydrogel material" refers to a crosslinked polymeric material which is not water-soluble and contains at least 10% by weight of water within its polymer matrix when fully hydrated, as known to a person skilled in the art.

As used in this application, the term "non-silicone hydrogel material" refers to a hydrogel material that is theoretically free of silicon, as known to a person skilled in the art.

As used in this application, the term "silicone hydrogel" refers to a hydrogel material containing silicone, as known to a person skilled in the art.

Typically, a contact lens has an anterior surface (or front surface) and an opposite posterior surface (or back surface) and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

Each of the anterior and posterior surfaces of a contact lens typically comprises a central optical zone, a peripheral zone (i.e., one or more non-optical zones) surrounding the central optical zone, as well known to a person skilled in the art. Correspondingly, a contact lens comprises a central optical zone and a peripheral zone (i.e., one or more non-optical zones) surrounding the central optical zone, by the combination of the anterior and posterior surfaces. FIG. 1 schematically illustrates a front elevational view (i.e., from the anterior surface side) of a typical contact lens. The contact lens 100 has a central optical zone 110, a peripheral zone 120, and a circular edge zone 140. The central optical zone 110 is typically located at the central section of the contact lens that corrects the refractive error of the wearer and can have a diameter ranging from about 7.0 mm to about 9.0 mm. The central optical zone 110 is also typically concentric with the geometrical center of the contact lens 100. The peripheral zone 120 can be composed of one or more peripheral bands or regions which are patched together to form a continuous surface. The peripheral zone 120 is typically concentric with the geometrical center of the contact lens 100. The circular edge zone 140 extends outwardly from the outer peripheral edge of the peripheral zone 130. The edge zone 140 is tangent to the peripheral zone and, in combination with the posterior surface, provides a substantially uniform thickness which may provide comfortable lens fit on an eye.

All the anodes and cathodes used in the invention by their very nature are electrically conductive, and in operation an electrical current can be driven through each of them to and from a power source. In accordance with the invention, the anodes and cathodes are comprised of a conventional inert electrically conductive material, e.g. platinum, graphite, palladium, aluminum, gold, silver, ruthenium, or boron doped diamond, transparent conductive oxides (e.g., indium tin oxide, fluorine-doped tin oxide, aluminium-doped zinc oxide, indium-doped cadmium-oxide, and the likes), carbon nanotubes, grapheme, transparent conductive polymers (e.g., poly(3,4-ethylenedioxythiophene), poly(styrene sulfonate)-doped poly(3,4-ethylenedioxythiophene), doped polyacetylene, doped polyaniline, polypyrrole, doped polythiophenes, doped poly(4,4-dioctylcyclopentadithiophene), and the likes), or any conductive material known to a person skilled in the art.

In a preferred embodiment, the anode comprises a chloride-inaccessible anode (i.e., an anode having a negatively charged membrane thereon, e.g., Nafion, or the like) for preventing chloride ions in tears from accessing the anode, thereby preventing chloride ions from being oxidized at the anode to form chlorine. Such a chloride-inaccessible anode can be prepared by dipping an electrode in an organic solution of a negatively-charged material and then evaporating organic solvent to form a negatively-charged membrane on the surface of the electrode. Such a negatively charged membrane allows only neutral molecules or cations (i.e., positively charged ions) to pass through to reach the surface of the anode. Any chloride ions in the tears would be rejected, but allowing free transport of sodium ions and neutral water molecules. This would allow the formation of oxygen and hydrogen ions at the anode, instead of forming chlorine (subsequently hypochlorous acid and hypochlorite) from the chloride ions in tears.

In accordance with the invention, the anode and the cathode independently of each other can be one large single continuous electrode, multiple electrodes, or a grid of electrodes. They can be in any kinds of shapes so long as they are suitable for being embedded in a contact lens. Preferably, they has a flat 3-dimensional shape known to a person skilled in the art, such as, e.g., a thin wire, an arc, a flat rectangle, a flat square, a flat circle, a flat circular sector, a regular or irregular flat polygon, a flat annular ring, a flat annular sector, or a combination thereof. The anode and the cathode can be located at or near the geometrical center of a contact lens or any place of the contact lens.

In a preferred embodiment, the anode and optionally the cathode are embedded in an area including the geometrical center of the contact lens. Preferably, the anode and the cathode are transparent or semi-transparent.

In a preferred embodiment, the anode and the cathode are embedded in a junction area between the central optical zone and the peripheral zone of the contact lens or in the peripheral zone but adjacent to the central optical zone. When the anode and the cathode are located in such an area, they would not interfere with the function of the central optical zone of a contact lens, even if the anode and the cathode are not transparent.

In a preferred embodiment, the anode and the cathode independently of each other have a shape of a flat annular ring which is concentric with the center of the contact lens and has a substantially even exterior peripheral edge having a diameter of from about 8 mm to about 14 mm. The width of the annular ring is preferably from about 0.5 mm to about 2.5 mm (preferably from about 0.75 mm to about 2.25 mm, more preferably about 0.9 mm to about 2.0 mm, even more preferably from about 1.2 mm to about 1.8 mm). The flat annular ring can have a substantially even interior peripheral edge or an uneven or jagged interior peripheral edge. The anode and the cathode independently of each other can be made of mesh of an electrically conductive material to increase their surface area for electrolysis reaction. It is believed that by having an node in shape of such a flat annular ring, oxygen can be generated to efficiently cover the whole central portion of the lens while imparting no or minimal interference to the function of the central optical zone, because of the lateral diffusion of the generated oxygen.

A "substantially even border or peripheral edge" as used herein refers to a border or a peripheral edge on which positions have substantially constant radial distances (i.e., from the lens center), namely differing from each other less than 20%. An "uneven or jagged peripheral edge" as used herein refers to a border or a peripheral edge on which positions have radial distances (i.e., from the lens center) which differ from each other by at least about 20%.

Figure 2:
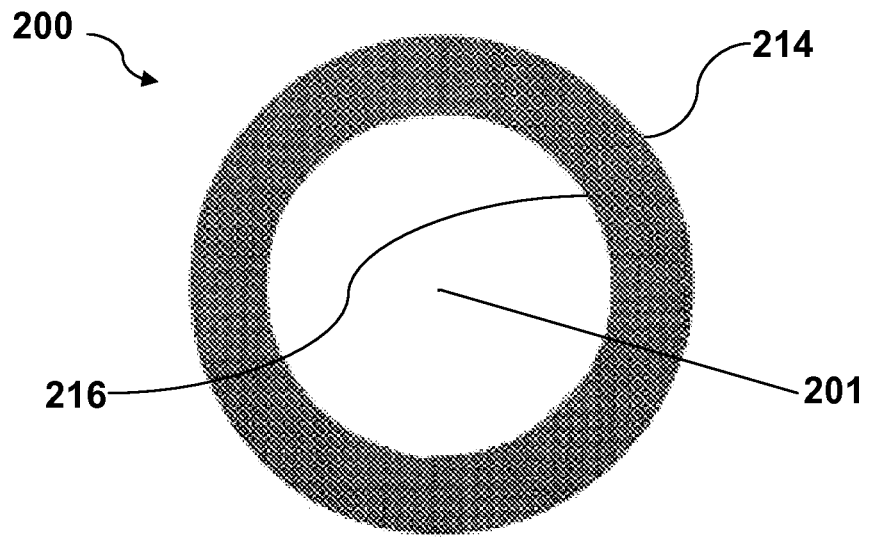
FIG. 2 illustrates a preferred shape of an anode which is embedded in a contact lens of the invention.

FIG. 2 illustrates schematically a preferred shape of an anode (and/or a cathode) 200 of the invention. The flat annular ring is concentric with the geometrical center 201 of a lens and has a substantially even exterior peripheral edge 214 and a substantially even interior peripheral edge 216. The exterior peripheral edge 14 can have a diameter of from about 12.5 mm to about 14 mm.

Figure 3:
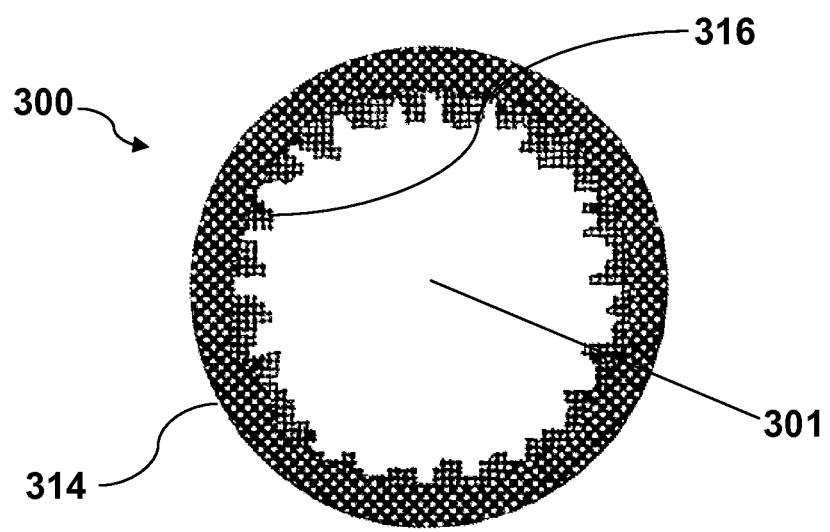
FIG. 3 illustrates another preferred shape of an anode which is embedded in a contact lens of the invention.

FIG. 3 illustrates schematically a preferred shape of an anode (and/or a cathode) 300 of the invention. The flat annular ring is concentric with the geometrical center 301 of a lens and has a substantially even exterior peripheral edge 314 and a jagged interior peripheral edge 316. The exterior peripheral edge 314 can have a diameter of from about 12.5 mm to about 14 mm. The anode (and/or a cathode) 300 of the invention is preferably made of mesh of an electrically conductive material.

Where the anode and optionally the cathode is a flat annular ring, they preferably have an opaque color and a dimension sufficient to partially or substantially completely overly the lens wearer's limbus area when the lens is on-eye and centered. The limbus area is the area of the eye located between the iris area and the sclera area of an eye. Preferably, the flat annular ring substantially completely overlies the limbus area. The innermost border, or edge closest to the geometric center of the lens, of the flat annular ring may be about 5 mm to about 12 mm, preferably about 6 to about 11.5 mm, even more preferably about 7 to about 11 mm, from the lens' geometric center. The ring may be of any suitable width and preferably is about 0.5 to about 2.5 mm in width, more preferably about 0.75 to about 1.75 mm in width, or even more preferably about 0.8 to about 1.25 mm in width. The anode and optionally the cathode can have many colors, for example, blue, gray, brown, light blue, turquoise, violet, dark-violet, blue-violet, aqua, yellow or green. A preferred color for the anode and optionally the cathode is black with violet tone.

By having a colored annular ring, the anode can function not only as an oxygen-generating element but also as an artificial limbal ring for enhancing a wearer's natural eye color and making them bolder and/or or larger as perceived by the ordinary viewer, if the limbal ring is of a color similar to the natural color of the iris, or the limbal ring is of a color the same as the natural color of the iris but having a lower lightness, or the limbal ring is of a darker color than the natural color of the iris.

The anode and the cathode can be spaced apart, but preferably are close to each other to minimize localized pH changes in the contact lens (higher local $H^+$ concentration around the surface of the anode and higher local $OH^-$ concentration). More preferably, the cathode is located between the anode and the anterior surface of the contact lens and separated from the anode by a negatively charged membrane.

In accordance with the invention, a control element embedded in a contact lens of the invention can contain means (e.g., one or more miniaturized electronic devices, such as microprocessors, memories for storing instructions and/or data for a specific prescription, and/or miniaturized embedded systems, as known to a person skilled in the art) for automatically applying a potential voltage between the anode and the cathode and driving an electrical current through the anode and the cathode to generate oxygen from electrolysis of water, and controlling the timing and duration of electrolysis of water when the contact lens is worn by a patient. The control element can also control other electronic devices and/or electro-active devices embedded in the contact lens.

Any power sources can be used in the invention. Examples of such power sources include without limitation batteries (e.g., lithium ion batteries, or the like), photovoltaic energy cells (e.g., a thin photovoltaic cell produced from, by way of example only, transparent photovoltaic polymeric films, or the like) for light into electric energy, thermoelectric cells for converting thermal energy into electric energy, piezoelectric cells (e.g., thin films of transparent piezoelectric polymers, or the like) for converting kinetic energy from movement of the eye into electric energy, capacitors (e.g., electrical thin film capacitors, or the like), o combinations thereof. The power source comprises preferably at least one battery, more preferably at least one rechargeable battery, even more preferably at least one thin film in shape of a flat annular ring or at least two thin film batteries in shape of a flat annular sector.

Thin film batteries can be single charge and rechargeable forms. Rechargeable thin film batteries are commercially available, for example, Oak Ridge National Laboratory has produced various forms since the early 1990s. Current commercial producers of such batteries include Excellatron Solid State, LLC (Atlanta, Ga.), Infinite Power Solutions (Littleton, Colo.), and Cymbet Corporation (Elk River, Minn.). A person skilled in the art knows how to form a thin film battery into any desirable three dimensional shape, for example, a flat annular ring or annular sector.

In accordance with the invention, the control element and the power source are preferably located between the anode and the anterior surface of the contact lens. In such a geometrical arrangement, the anode will alleviate the problem associated with the oxygen impermeability of the control element and the power source.

In a preferred embodiment, a contact lens of the invention further comprises an electro-optic element therein for vision correction. Electro-optic elements have been disclosed in U.S. Pat. Nos. 6,851,805, 7,490,936 and 8,154,804 (herein incorporated by references in their entireties) and can be used in this invention.

In a preferred embodiment, a contact lens of the invention further comprises a coating thereon. Preferably, the coating is a hydrogel layer having a higher water content and a thickness of at least about 0.05 micrometers (preferably from about 0.1 micrometers to about 20 micrometers, more preferably from about 0.25 micrometers to about 15 micrometers, even more preferably from about 0.5 μm to about 12.5 μm, particularly preferably from about 1 μm to about 10 μm) as measured with atomic force microscopy across a cross section from the posterior surface to the anterior surface of the silicone hydrogel contact lens in fully hydrated state and being substantially free of silicone (i.e., as characterized by having a surface silicon atomic percentage of about 5% or less, preferably about 4% or less, more preferably about 3% or less, of total elemental percentage as measured by XPS analysis of the contact lens in dried state).

Contact lenses of the invention can be manufactured according to a modified cast-molding process involving disposable molds (e.g., PCT published patent application No. WO/87/04390, EP-A 0 367 513, U.S. Pat. No. 5,894,002) or by the so-called Lightstream Technology™ (Alcon) which involving reusable molds and curing a lens-forming composition under a spatial limitation of actinic radiation (U.S. Pat. Nos. 5,508,317, 5,583,163, 5,789,464, 5,849,810, and 8,163,206) from a lens formulation for forming a non-silicone hydrogel but preferably a silicone hydrogel.

A "lens formulation" refers to a polymerizable composition which can be can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art such as: non-silicone hydrogel and silicone hydrogel.

For production of silicone hydrogel (SiHy) contact lenses, a SiHy lens formulation for cast-molding of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant SiHy contact lenses then can be subjected to extraction with an extraction solvent to remove unpolymerized components from the resultant lenses and to hydration process, as known by a person skilled in the art. Numerous silicone hydrogel lens formulations have been described in numerous patents and patent applications published by the filing date of this application. All of them can be used in obtaining a SiHy contact lens of the invention. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, can also be used in making SiHy contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, a contact lens can be produced as follows. First, a mold comprising one female mold half and male mold half is obtained, wherein the female mold half defines a first molding (or optical) surface which corresponds to the anterior surface of a contact lens and the second mold half defines a second molding (or optical) surface which corresponds to the posterior surface of the contact lens, wherein the female and male mold halves are configured to receive each other such that a lens forming cavity is formed between the first molding surface and the second molding surface. The molding surface of a mold half is the cavity-forming surface of the mold and in direct contact with lens formulation. Second, a first amount of a lens formulation (or preferably a silicone hydrogel lens formulation) is deposed onto the first molding surface of the female mold half to form a first layer with a desired thickness (e.g., a thickness of from about 5 micrometers to about 50 micrometers, preferably from about 5 micrometers to about 40 micrometers, more preferably from about 10 micrometers to about 30 micrometers) according to any method known to a person skilled in the art. After the formation of the first layer of the lens formulation on the first molding surface of the female mold half, the first layer of the lens formulation can be cured partially or substantially (optional step). Third, at least one anode for electrolytically generating oxygen, at least one cathode, a control element, and a power source are placed on top of the first layer of the lens formulation which is optionally cured. Fourth, a second amount of the lens formulation is deposed all over the first layer, the at least one anode for electrolytically generating oxygen, at least one cathode, a control element, and a power source to form a second layer of the lens formulation. Fifth, the male mold half is closed with the female mold half. Sixth, the closed mold with the first and second layers of lens formulation and the anode, the cathode, the control element, and the power source sandwiched between the first and second layers of the lens formulation within the mold cavity formed between the first and second molding surfaces is subjected to curing conditions (thermal curing or actinic curing conditions) to form a contact lens of the invention. It is understood that a result contact lens of the invention can be subjected to other processes, lens extraction, hydration, coating, and packaging, autoclave, and combinations thereof, as known to a person skilled in the art.

In accordance with the invention, the anode, the cathode, the control element, and the power source can be encapsulated in a hydrogel material (preferably a silicone hydrogel material) to form a capsule in a form of annular ring, prior to be placed on top of the first layer of the lens formulation in the third step of the process described above.

A person skilled in the art knows well how to apply a coating to a contact lens. Preferably, a coating process described in U.S. Pat. No. 8,529,057 (herein incorporated by reference in its entirety) is used to form a non-silicone hydrogel coating on the surface of a contact lens of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

What is claimed is:

1. A contact lens, comprising:
(1) a lens body composed of a silicone hydrogel material;
(2) at least one anode for electrolytically generating oxygen from water in contact with the anode;
(3) at least one cathode operatively coupled with said at least one anode to form an electrolytic cell;
(4) a power source; and
(5) a control element,
wherein the anode, the cathode, the power source, and the control element are embedded within the lens body and operatively connected to each other,
wherein the power source comprises at least one battery,
wherein the control element is capable of automatically applying a potential voltage between the anode and the cathode and driving an electrical current through the anode and the cathode to generate oxygen from electrolysis of water, and controlling the timing and duration of electrolysis of water when the contact lens is worn by a patient,
wherein the contact lens has an anterior surface and an opposite posterior surface and a circumferential edge where the anterior and posterior surfaces are tapered off,
wherein the contact lens comprises a central optical zone, a peripheral zone surrounding the central optical zone, and an edge zone surrounding the peripheral zone,
wherein the anode and the cathode independently of each other have a shape of a flat annular ring which is concentric with the center of the contact lens and has a substantially even exterior peripheral edge having a diameter of from about 8 mm to about 14 mm and a width of from about 0.5 mm to about 2.5 mm,
wherein the anode and the cathode have an opaque color and partially or completely overly the lens wearer's limbus area when the contact lens is on-eye and centered, provided that the innermost border or edge, closest to the geometric center of the lens, of the flat annular ring is about 5 mm to about 12 mm from the geometric center of the contact lens.

2. The contact lens of claim 1, wherein the cathode is located between the anode and the anterior surface of the contact lens and separated from the anode by a negatively charged membrane.

3. A contact lens, comprising:
(1) a lens body composed of a silicone hydrogel material;
(2) a coating on the lens body, wherein the coating is a hydrogel layer having a higher water content and a thickness of at least about 0.05 micrometers as measured with atomic force microscopy across a cross section from the posterior surface to the anterior surface of the silicone hydrogel contact lens in fully hydrated state and being substantially free of silicone;
(3) at least one anode for electrolytically generating oxygen from water in contact with the anode;
(4) at least one cathode operatively coupled with said at least one anode to form an electrolytic cell;
(5) a power source; and
(6) a control element,
wherein the anode, the cathode, the power source, and the control element are embedded within the lens body and operatively connected to each other,
wherein the power source comprises at least one battery,
wherein the control element is capable of automatically applying a potential voltage between the anode and the cathode and driving an electrical current through the anode and the cathode to generate oxygen from electrolysis of water, and controlling the timing and duration of electrolysis of water when the contact lens is worn by a patient,
wherein the contact lens has an anterior surface and an opposite posterior surface and a circumferential edge where the anterior and posterior surfaces are tapered off,
wherein the contact lens comprises a central optical zone, a peripheral zone surrounding the central optical zone, and an edge zone surrounding the peripheral zone.

4. The contact lens of claim 3, wherein the anode comprises a chloride-inaccessible anode which is an electrode having a negatively charged membrane thereon.

5. The contact lens of claim 3, wherein the anode and the cathode independently of each other comprise one large single continuous electrode, multiple electrodes, or a grid of electrodes.

6. The contact lens of claim 3, wherein the anode and the cathode independently of each other is in a shape of a thin wire, an arc, a flat rectangle, a flat square, a flat circle, a flat circular sector, a regular or irregular flat polygon, a flat annular ring, a flat annular sector, or a combination thereof.

7. The contact lens of claim 3, wherein the anode and optionally the cathode are embedded in an area including the geometrical center of the contact lens.

8. The contact lens of claim 7, wherein the anode and the cathode are transparent or semi-transparent.

9. The contact lens of claim 3, wherein the anode and the cathode are embedded in a junction area between the central optical zone and the peripheral zone of the contact lens or in the peripheral zone but adjacent to the central optical zone.

10. The contact lens of claim 3, wherein the anode and the cathode independently of each other have a shape of a flat annular ring which is concentric with the center of the contact lens and has a substantially even exterior peripheral edge having a diameter of from about 8 mm to about 14 mm and a width of from about 0.5 mm to about 2.5 mm.

11. The contact lens of claim 10, wherein the anode and the cathode have an opaque color and partially or completely overly the lens wearer's limbus area when the contact lens is on-eye and centered, provided that the innermost border or edge, closest to the geometric center of the lens, of the flat annular ring is about 5 mm to about 12 mm from the geometric center of the contact lens.

12. The contact lens of claim 11, wherein the cathode is located between the anode and the anterior surface of the contact lens and separated from the anode by a negatively charged membrane.

13. The contact lens of claim 3, wherein the contact lens further comprises an electro-optic element embedded therein for vision correction.

14. The contact lens of claim 3, wherein the control element and the power source are located between the anode and the anterior surface of the contact lens.

15. The contact lens of claim 3, wherein the contact lens further comprises a coating thereon.

16. The contact lens of claim 3, wherein the anode and cathode have identical shape.

17. The contact lens of claim 3, wherein said at least one battery is a thin film battery.

18. A method for producing a contact lens, comprising the steps of:
(1) obtaining a mold which comprises one female mold half and one male mold half, wherein the female mold half defines a first molding (or optical) surface which corresponds to the anterior surface of a contact lens and the second mold half defines a second molding (or optical) surface which corresponds to the posterior surface of the contact lens, wherein the female and male mold halves are configured to receive each other such that a lens forming cavity is formed between the first molding surface and the second molding surface when being closed;
(2) deposing a first amount of a lens formulation onto the first molding surface of the female mold half to form a first layer with a desired thickness;
(3) optionally curing the first layer of the lens formulation on the first molding surface of the female mold half;
(4) placing at least one anode for electrolytically generating oxygen, at least one cathode operatively coupled with said at least one anode to form an electrolytic cell, a control element, and a power source on top of the first layer of the lens formulation which is optionally cured, wherein the power source comprises at least one battery, wherein the control element is capable of automatically applying a potential voltage between the anode and the cathode and driving an electrical current through the anode and the cathode to generate oxygen from electrolysis of water, and controlling the timing and duration of electrolysis of water when the contact lens is worn by a patient;
(5) deposing a second amount of the lens formulation over the first layer, the anode, the cathode, the control element, and the power source to form a second layer of the lens formulation, wherein the anode, the cathode, the control element, and the power source are sandwiched between the first and second layers of the lens formulation;
(6) closing the male mold half onto the female mold half to enclose the anode, the cathode, the control element, and the power source sandwiched between the first and second layers of the lens formulation within the lens-forming cavity formed between the first and second molding surfaces;
(7) curing thermally or actinically the first and second layers of the lens formulation within the lens-forming cavity to form the contact lens.

19. The method of claim 18, wherein the anode, the cathode, the control element, and the power source is encapsulated in a hydrogel material to form a capsule in a form of annular ring, prior to be placed on top of the first layer of the lens formulation in step (4).

20. The method of claim 18, wherein said at least one battery is a thin film battery.

* * * * *